United States Patent
Satou et al.

(10) Patent No.: US 11,005,409 B2
(45) Date of Patent: May 11, 2021

(54) MOTOR DRIVE APPARATUS INCLUDING SHORT-CIRCUIT JUDGMENT UNIT FOR DC LINK CAPACITOR

(71) Applicant: Fanuc Corporation, Yamanashi (JP)

(72) Inventors: Akinori Satou, Yamanashi (JP); Shinichi Horikoshi, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 16/408,846

(22) Filed: May 10, 2019

(65) Prior Publication Data

US 2019/0372504 A1 Dec. 5, 2019

(30) Foreign Application Priority Data

May 31, 2018 (JP) .............................. JP2018-105100

(51) Int. Cl.
*H02P 29/024* (2016.01)
*H02P 27/06* (2006.01)

(52) U.S. Cl.
CPC ............ *H02P 29/025* (2013.01); *H02P 27/06* (2013.01); *H02P 2201/03* (2013.01)

(58) Field of Classification Search
CPC .... H02H 7/16; H02H 3/20; H02H 9/04; H02J 7/345; H02J 3/383; G01R 31/00; H02M 7/48; H02M 1/32; H02P 29/025; H02P 27/06

See application file for complete search history.

(56) References Cited

U.S. PATENT DOCUMENTS

| | | | | |
|---|---|---|---|---|
| 4,805,063 A | * | 2/1989 | Kataoka | G01R 31/42 361/16 |
| 5,771,163 A | * | 6/1998 | Moriguchi | H02M 3/285 363/25 |
| 5,880,589 A | * | 3/1999 | Okano | G01R 31/64 324/548 |
| 6,181,576 B1 | * | 1/2001 | Ikeda | B23K 9/1043 363/17 |

(Continued)

FOREIGN PATENT DOCUMENTS

| | | |
|---|---|---|
| GB | 2520121 | 5/2015 |
| JP | 2007-295686 A | 11/2007 |

(Continued)

*Primary Examiner* — Said Bouziane
(74) *Attorney, Agent, or Firm* — RatnerPrestia

(57) ABSTRACT

A motor drive apparatus includes a converter which converts AC power into DC power and outputs it to a DC link, an inverter which converts the DC power of the DC link into AC power for driving a motor, DC link capacitors connected in series with each other, resistors connected in parallel with the DC link capacitors and connected in series with each other, a DC link voltage detection unit, a current-carrying element which is connected between one of connection points connecting the DC link capacitors to each other and one of connection points connecting the resistors to each other, and carries a current when the applied voltage is higher than a predetermined value, and a short-circuit judgment unit which judges that at least one of the DC link capacitors has shorted when the DC link voltage value is larger than an upper limit or smaller than a lower limit.

4 Claims, 8 Drawing Sheets

(56) References Cited

U.S. PATENT DOCUMENTS

| | | | |
|---|---|---|---|
| 7,084,638 B1* | 8/2006 | Kramer | H02H 7/16 |
| | | | 324/548 |
| 7,586,770 B2* | 9/2009 | Toba | H02H 7/1225 |
| | | | 323/266 |
| 2010/0085667 A1* | 4/2010 | Hallak | H02H 7/16 |
| | | | 361/16 |
| 2011/0062962 A1* | 3/2011 | Wolf | G01R 31/64 |
| | | | 324/548 |
| 2012/0281443 A1* | 11/2012 | Wolf | H02M 7/48 |
| | | | 363/55 |
| 2017/0288573 A1* | 10/2017 | Hong | H02M 1/32 |

FOREIGN PATENT DOCUMENTS

| | | |
|---|---|---|
| JP | 4021431 B | 12/2007 |
| JP | 2014-131446 A | 7/2014 |
| JP | 5689497 B | 3/2015 |

\* cited by examiner

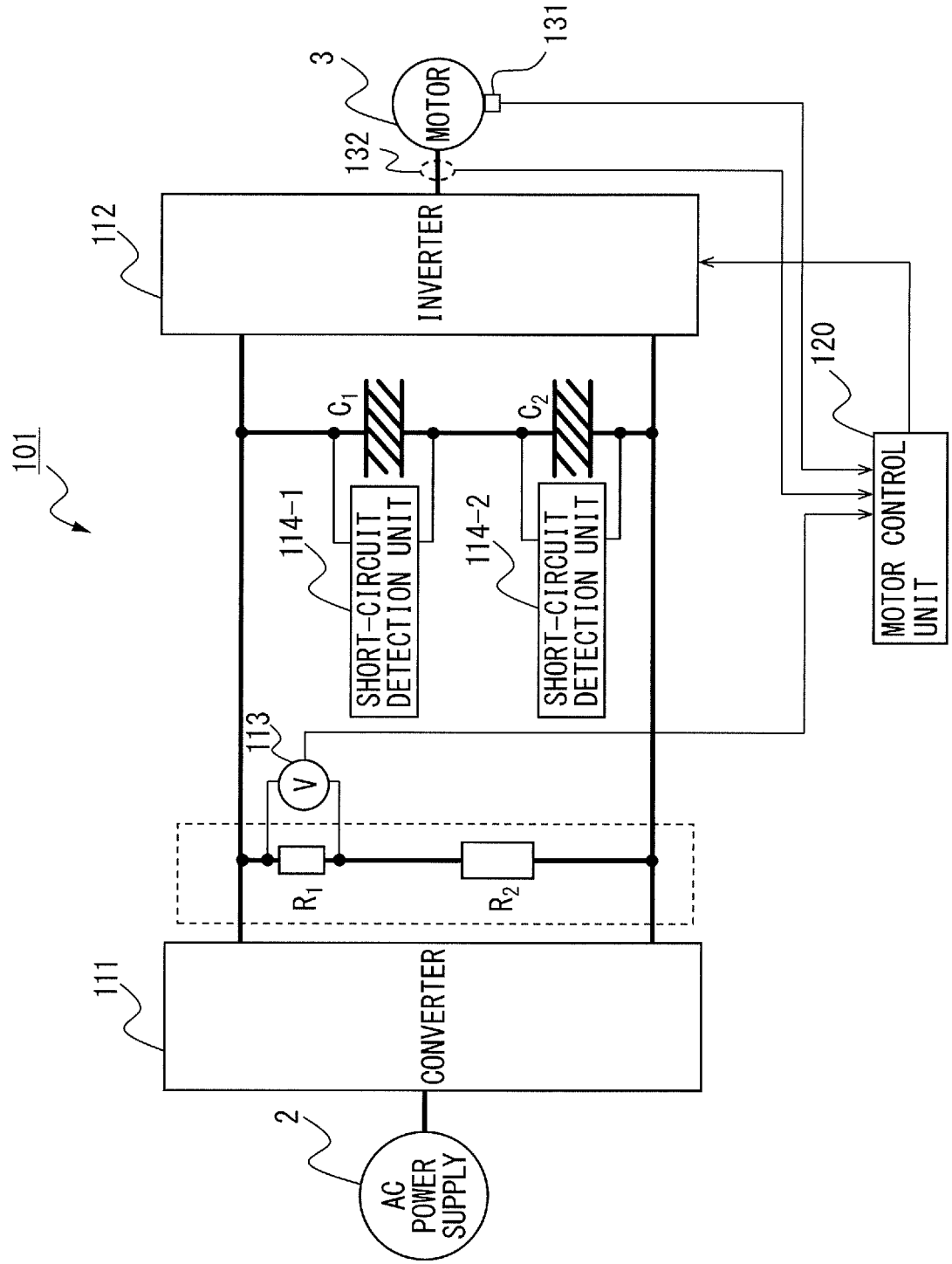

MOTOR DRIVE APPARATUS INCLUDING SHORT-CIRCUIT JUDGMENT UNIT FOR DC LINK CAPACITOR

CROSS-REFERENCE TO RELATED APPLICATIONS

This application is a new U.S. patent application that claims benefit of Japanese Patent Application No. 2018-105100, filed May 31, 2018, the disclosure of this application is being incorporated herein by reference in its entirety for all purposes.

BACKGROUND OF THE INVENTION

1. Field of the Invention

The present invention relates to a motor drive apparatus including a short-circuit judgment unit for a DC link capacitor.

2. Description of the Related Art

In a motor drive apparatus which drives motors in a machine tool, forging machinery, an injection molding machine, industrial machinery, or various robots, AC power supplied from an AC power supply is converted into DC power and output to a DC link by a converter, the DC power in the DC link is further converted into AC power by an inverter, and the AC power is supplied to the motor provided for each drive axis as drive power.

The DC link includes a DC link capacitor having the function of suppressing pulsation of the DC output of the converter and the function of storing DC power. The DC link capacitor is also called a smoothing capacitor. Since a DC link capacitor is generally resistant to voltage, DC link capacitors are often connected in series with each other to withstand a high DC voltage in the DC link.

As disclosed in, e.g., Japanese Patent No. 4021431, a converter apparatus which is connected to an inverter circuit for driving a motor, via a DC link including a storage unit capable of charging regenerative power for the motor, converts AC power supplied from a power supply into DC power, and supplies the DC power to the inverter circuit via the DC link is known to include a voltage detection unit which detects a DC link voltage of the DC link, a voltage holding unit which holds the DC link voltage detected at start of charging the regenerative power in the storage unit, and a charging stop unit which stops charging in the storage unit when the currently detected DC link voltage is higher than an upper limit voltage obtained by adding a predetermined potential difference to the DC link voltage held in the voltage holding unit.

As disclosed in, e.g., Japanese Patent No. 5689497, a motor drive apparatus is known to include a converter unit which converts an AC voltage input from a main power supply into a DC voltage, a DC link unit which rectifies the DC voltage output from the converter unit, an inverter unit which converts the DC voltage rectified by the DC link unit into an AC voltage for driving a motor by a semiconductor switching element, a voltage application unit which is provided independently of the main power supply and applies a voltage to the DC link unit, a voltage detection unit which detects the voltage of the DC link unit after the voltage is applied by the voltage application unit, and an abnormality judgment unit which judges whether an abnormality has occurred in the DC link unit, based on a value, measured for a predetermined time, of the voltage detected by the voltage detection unit, and a rate of temporal change in the voltage.

As disclosed in, e.g., Japanese Unexamined Patent Publication No. 2014-131446, a power conversion device is known to include a converter circuit (2) which rectifies a voltage from an AC power supply (7), an inverter circuit (6) which is connected in parallel with an output of the converter circuit (2), converts power from the converter circuit (2) into AC power having a predetermined voltage and frequency by a switching operation of switching elements (Su, Sv, Sw, Sx, Sy, Sz), and outputs the AC power to a motor (8), an inverter circuit control unit (13) which controls the switching operation of the switching elements (Su, Sv, Sw, Sx, Sy, Sz), a DC link unit (3) which includes a first capacitor (3a) connected in parallel with an input of the inverter circuit (6) and used to smooth pulsation of a voltage generated upon the switching operation of the switching elements (Su, Sv, Sw, Sx, Sy, Sz) and connects the converter circuit (2) to the inverter circuit (6), a series circuit (5) which includes a second capacitor (4c) and a switch (5a) connected in series with each other and is connected in parallel with the first capacitor (3a), and a switch control unit (14) which controls opening and closing of the switch (5a) to suppress an excess voltage of the DC link unit (3).

As disclosed in, e.g., Japanese Unexamined Patent Publication No. 2007-295686, a direct AC power conversion device is known to include a converter unit (1) which converts a three-phase AC input voltage into a DC voltage, an inverter unit (2) which converts the DC voltage converted by the converter unit (1) into a predetermined three-phase AC output voltage, a positive first DC link unit (L1) and a negative second DC link unit (L2) which connect the converter unit (1) to the inverter unit (2), and a clamp circuit (3, 13, 23) connected between the first DC link unit (L1) and the second DC link unit (L2) and including at least two capacitance elements (C1, C2, C3), wherein the clamp circuit (3, 13, 23) performs charging in the capacitance elements (C1, C2, C3) by a regenerative current from the inverter unit (2) with each of the capacitance elements (C1, C2, C3) serially connected between the first DC link unit (L1) and the second DC link unit (L2), while the clamp circuit (3, 13, 23) performs discharging from the capacitance elements (C1, C2, C3) with each of the capacitance elements (C1, C2, C3) parallelly connected between the first DC link unit (L1) and the second DC link unit (L2).

As disclosed in, e.g., GB Patent No. 2520121, a short-circuit detection mechanism is known to be provided for each of series-connected DC link capacitors to detect short-circuit failure.

SUMMARY OF INVENTION

When short-circuit failure occurs in one of series-connected DC link capacitors provided in a DC link between a converter and an inverter in a motor drive apparatus, a voltage higher than previously is applied to normal DC link capacitors having no short-circuit failure. When an excess voltage equal to or greater than the voltage resistance is continuously applied to the normal DC link capacitors (i.e., DC link capacitors having no short-circuit failure at first) for a long time, they may break or fire. As a result, a motor, a motor drive apparatus which drives the motor, or a machine or a system equipped with the motor driven by the motor drive apparatus, for example, may suffer any type of failure such as breakage or deformation. To solve this problem, it is very important to early detect short-circuit failure of the DC link capacitors. For example, a short-circuit detection unit may be provided for each of series-connected DC link capacitors to detect short-circuit failure. However, providing a short-circuit detection unit for each DC link capacitor undesirably increases the circuit footprint, the number of parts, and the cost. Therefore, a demand has arisen for a technique capable of ensuring safety by early detecting short-circuit failure of series-connected DC link capacitors provided in a DC link between a converter and an inverter in a motor drive apparatus, at low cost.

According to one aspect of the present disclosure, a motor drive apparatus includes a converter configured to convert AC power input from an AC power supply into DC power and output the DC power to a DC link, an inverter configured to convert the DC power in the DC link into AC power for driving a motor and output the AC power, a plurality of DC link capacitors provided in the DC link and connected in series with each other, a plurality of resistors connected in parallel with the plurality of DC link capacitors and connected in series with each other, a DC link voltage detection unit configured to detect a DC link voltage value as a value of a voltage applied to a positive and negative terminal of the DC link, based on a voltage applied to one of the plurality of resistors, a current-carrying element which is connected between one of connection points connecting the DC link capacitors to each other and one of connection points connecting the resistors to each other, and is configured to carry a current only when a voltage applied to the current-carrying element is higher than a predetermined value, and a short-circuit judgment unit configured to judge that at least one of the plurality of DC link capacitors has shorted in one of a case where the DC link voltage value is larger than a predetermined upper limit and a case where the DC link voltage value is smaller than a predetermined lower limit.

BRIEF DESCRIPTION OF THE DRAWINGS

The present invention will be more clearly understood with reference to the following accompanying drawings:

FIG. 8 is a circuit diagram for explaining a method for detecting a short-circuit of a DC link capacitor in a conventional motor drive apparatus.

DETAILED DESCRIPTION

A motor drive apparatus including a short-circuit judgment unit for a DC link capacitor will be described below with reference to the drawings. These drawings use different scales as appropriate to facilitate an understanding. The mode illustrated in each drawing is one example for carrying out the present invention, and the present invention is not limited to the embodiments illustrated in these drawings.

Figure 1:
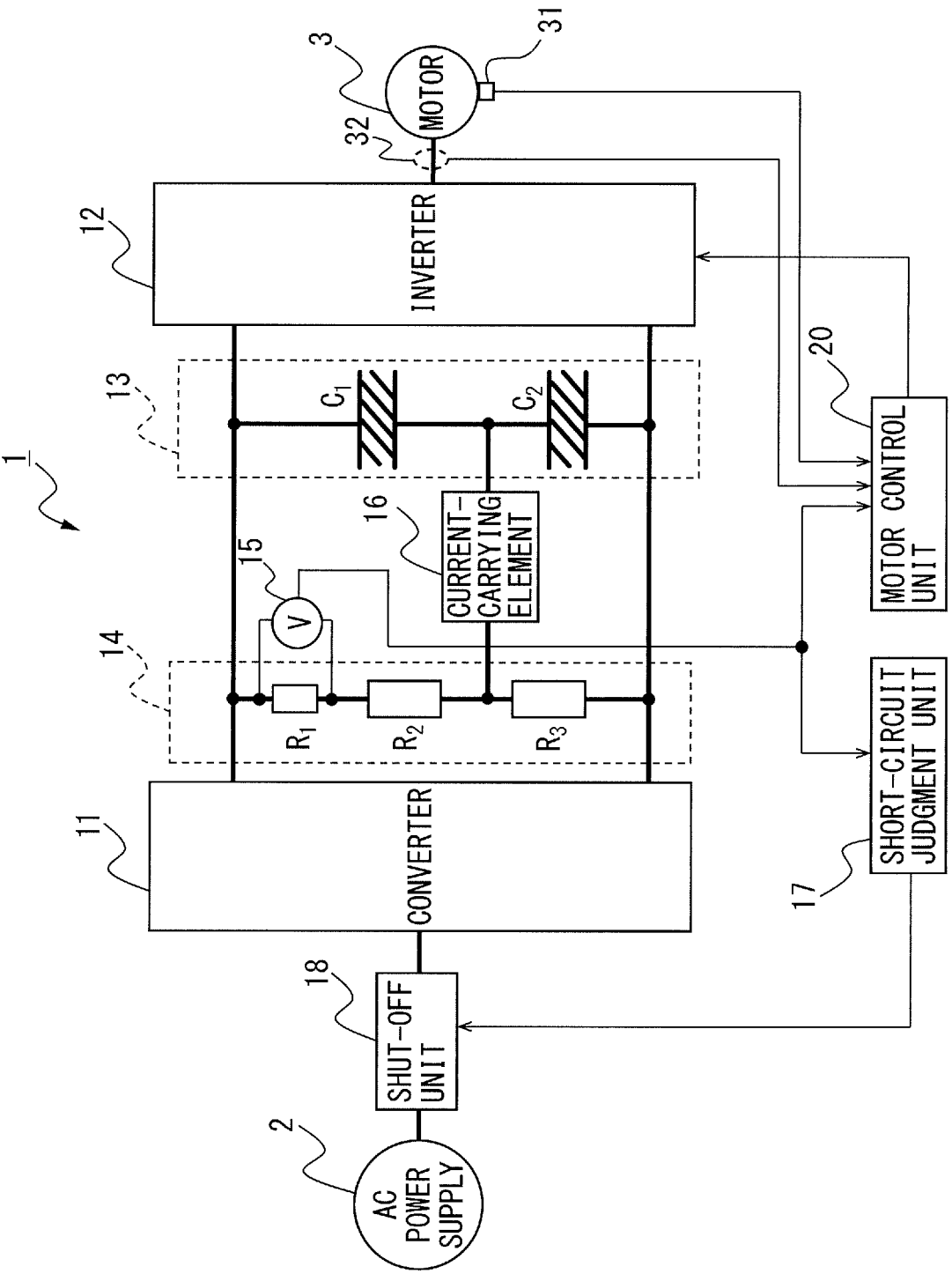
FIG. 1 is a circuit diagram illustrating a motor drive apparatus according to an embodiment of the present disclosure.

FIG. 1 is a circuit diagram illustrating a motor drive apparatus according to an embodiment of the present disclosure.

The case where one AC motor of the single-winding type (to be simply referred to as a "motor" hereinafter) 3 is controlled by a motor drive apparatus 1 connected to an AC power supply 2 will be taken as an example below. The number of motors 3 does not particularly limit this embodiment and may be other than one. The numbers of phases of the AC power supply 2 and the motor 3 do not particularly limit this embodiment, and a three- or single-phase configuration, for example, may be used. Examples of the AC power supply 2 may include a three-phase 400-V AC power supply, a three-phase 200-V AC power supply, a three-phase 600-V AC power supply, and a single-phase 100-V AC power supply. The type of motor 3 does not particularly limit this embodiment, either, and an induction or synchronous motor, for example, may be used. Machines equipped with the motors 3 include, e.g., a machine tool, a robot, forging machinery, an injection molding machine, industrial machinery, various electrical appliances, an electric train, an automobile, and an aircraft.

The motor drive apparatus 1 controls driving of the motor 3 by controlling an inverter 12 which converts power between the DC power in a DC link and the AC power serving as drive power or regenerative power for the motor 3, like general motor drive apparatuses. A motor control unit 20 in the motor drive apparatus 1 generates a switching command for controlling the speed, the torque, or the rotor position of the motor 3, based on, e.g., the (rotor) rotation speed of the motor 3 detected by a speed detector 31 (speed feedback), a current flowing through the winding of the motor 3 and detected by a current detector 32 (current feedback), a predetermined torque command, and an operation program for the motor 3. A power conversion operation by the inverter 12 is controlled based on the switching command generated by the motor control unit 20.

The motor drive apparatus 1 includes a converter 11, an inverter 12, DC link capacitors 13, resistors 14, a DC link voltage detection unit 15, a current-carrying element 16, a short-circuit judgment unit 17, a shut-off unit 18, and a motor control unit 20, as illustrated in FIG. 1.

The converter 11 converts AC power input from the AC power supply 2 into DC power and outputs the DC power to the DC link on the DC side. Examples of the converter 11 may include a diode rectifier circuit, a 120-degree conduction rectifier circuit, and a PWM switching control rectifier circuit including a switching element. The converter 11 serves as a three-phase bridge circuit when the AC power supply 2 has a three-phase configuration, and as a single-phase bridge circuit when the AC power supply 2 has a single-phase configuration. When the converter 11 serves as a diode rectifier circuit, it rectifies an alternating current input from the AC power supply 2 and outputs a direct current to the DC link. When the converter 11 serves as a 120-degree conduction rectifier circuit or a PWM switching control rectifier circuit, it is implemented as a bidirectional AC/DC-convertible power converter which can convert AC power input from the AC power supply 2 into DC power and output the DC power to the DC link, and can convert the DC power in the DC link into AC power and return the AC power to the AC power supply 2 during power supply regeneration. When the converter 11 serves as a PWM switching control rectifier circuit, it is implemented in a bridge circuit of switching elements and diodes connected in antiparallel with the switching elements. In this case, examples of the switching element may include an IGBT, a thyristor, a GTO (Gate Turn-OFF thyristor), and a transistor, but the type of switching element itself does not limit this embodiment, and other types of switching elements may be used. The DC output of the converter 11 is connected in parallel with the DC input of the inverter 12 via the DC link. An AC reactor and an AC line filter, for example, are provided on the AC input side of the converter 11, although they are not illustrated in FIG. 1.

The inverter 12 converts the DC power in the DC link into AC power for driving the motor 3 and outputs the AC power. The inverter 12 is implemented in a bridge circuit of switching elements and diodes connected in antiparallel with the switching elements. The inverter 12 serves as a three-phase bridge circuit when the motor 3 has a three-phase configuration, and as a single-phase bridge circuit when the motor 3 has a single-phase configuration. The inverter 12 converts power between the DC power in the DC link and the AC power serving as drive power or regenerative power for the motor 3, by ON/OFF control of each switching element based on the switching command received from the motor control unit 20. More specifically, the inverter 12 performs the switching operation of the internal switching elements, based on the switching command received from the motor control unit 20, to convert DC power supplied from the converter 11 via the DC link into AC power having a desired voltage and a desired frequency for driving the motor 3 and output the AC power (inversion operation). The motor 3 thus operates based on the supplied variable-voltage, variable-frequency AC power. Regenerative power occurs during deceleration of the motor 3, but the switching operation of the internal switching elements is performed based on the switching command received from the motor control unit 20, to convert the AC regenerative power occurring in the motor 3 into DC power and return the DC power to the DC link (rectification operation). Examples of the switching element may include an IGBT, a thyristor, a GTO, and a transistor, but the type of switching element itself does not limit this embodiment, and other types of switching elements may be used.

The DC link includes DC link capacitors 13 connected in series with each other. The DC link capacitors 13 have the function of suppressing pulsation of the DC output of the converter 11 and the function of storing DC power. Examples of the DC link capacitors 13 may include electrolytic capacitors and film capacitors. Since a DC link capacitor is generally resistant to voltage, such capacitors are connected in series with each other to withstand a high DC voltage in the DC link. FIG. 1 illustrates, as an example, two DC link capacitors $C_1$ and $C_2$ connected in series with each other. Three or more DC link capacitors 13 may be used.

The DC link further includes resistors (to be also sometimes referred to as "voltage dividing resistors" hereinafter) 14 connected in series with each other. In the DC link, the series-connected resistors 14 are connected in parallel with the series-connected DC link capacitors 13. FIG. 1 illustrates, as an example, three resistors $R_1$, $R_2$, and $R_3$ connected in series with each other. Of these resistors, the resistor $R_1$ is used as a voltage detection resistor for detecting a DC link voltage. An example of each resistance value is $R_1$=100 Ω, $R_2$=500 kΩ, and $R_3$=500 kΩ, but resistance values other than this example may be used.

The DC link voltage detection unit 15 detects a DC link voltage value as the value of a voltage applied to a positive and negative terminal of the DC link (i.e., the voltage on the DC output side of the converter 11 or the voltage on the DC input side of the inverter 12), and is generally provided to control the DC link voltage to be constant in the motor drive apparatus 1. The DC voltage in the DC link is too high to be directly applied across detection terminals of the DC link voltage detection unit 15. Under the circumstances, generally, the voltage applied to the positive and negative terminal of the DC link is divided by the series-connected resistors 14, and the voltage applied to one (the resistor $R_1$ in the example illustrated in FIG. 1) of the resistors 14 is detected by the DC link voltage detection unit 15. The DC link voltage detection unit 15 outputs, as a DC link voltage value, a value obtained by converting the detected voltage value in accordance with the Ohm's law. In the example illustrated in FIG. 1, the DC link voltage value is calculated as the following equation (1):

DC Link Voltage Value=Voltage Value Applied to Resistor $R_1$×(Resistance Value of Resistor $R_1$+Resistance Value of Resistor $R_2$+Resistance Value of Resistor $R_3$)/Resistance Value of Resistor $R_1$     (1)

The DC link voltage value output from the DC link voltage detection unit 15 is sent to the motor control unit 20 and used to control the DC link voltage to be constant, and is further used for short-circuit judgment processing in the short-circuit judgment unit 17 (to be described later) in this embodiment.

The current-carrying element 16 is connected between one of connection points connecting the DC link capacitors to each other and one of connection points connecting the resistors to each other. The current-carrying element 16 carries a current only when the voltage applied to it is higher than a predetermined value, and includes, e.g., a Zener diode and a varistor. The current-carrying element 16 will be described in detail later.

The short-circuit judgment unit 17 judges that at least one of the DC link capacitors 13 has shorted when the DC link voltage value detected by the DC link voltage detection unit 15 is larger than a predetermined upper limit or smaller than a predetermined lower limit. The judgment result obtained by the short-circuit judgment unit 17 is sent to the shut-off unit 18. Short-circuit judgment processing of the short-circuit judgment unit 17 will be described in detail later.

The shut-off unit 18 shuts off flow of AC power from the AC power supply 2 into the converter 11 when the short-circuit judgment unit 17 judges that at least one of the capacitors 13 has shorted. Examples of the shut-off unit 18 may include a magnetic contactor, a relay, and a power semiconductor switching element. Assuming, for example, that the shut-off unit 18 is implemented as a magnetic contactor, when the short-circuit judgment unit 17 judges that at least one of the capacitors 13 has shorted, the short-circuit judgment unit 17 outputs a shut-off command (open command) to the shut-off unit 18, opens the contact point of the magnetic contactor, and shuts off power supply from the AC power supply 2 to the converter 11. This reliably shuts off flow of power from the AC power supply 2 into the DC link via the converter 11, no current flows into normal capacitors having no short-circuit failure, no voltage is applied to them, and no breakage therefore occurs, ensuring safety. A shut-off operation by the shut-off unit 18 is preferably performed as soon as possible after the short-circuit judgment unit 17 judges that at least one of the capacitors 13 has shorted. Shut-off processing of the shut-off unit 18 will be described in detail later.

The current-carrying element 16 will be described in detail below.

Figure 2:
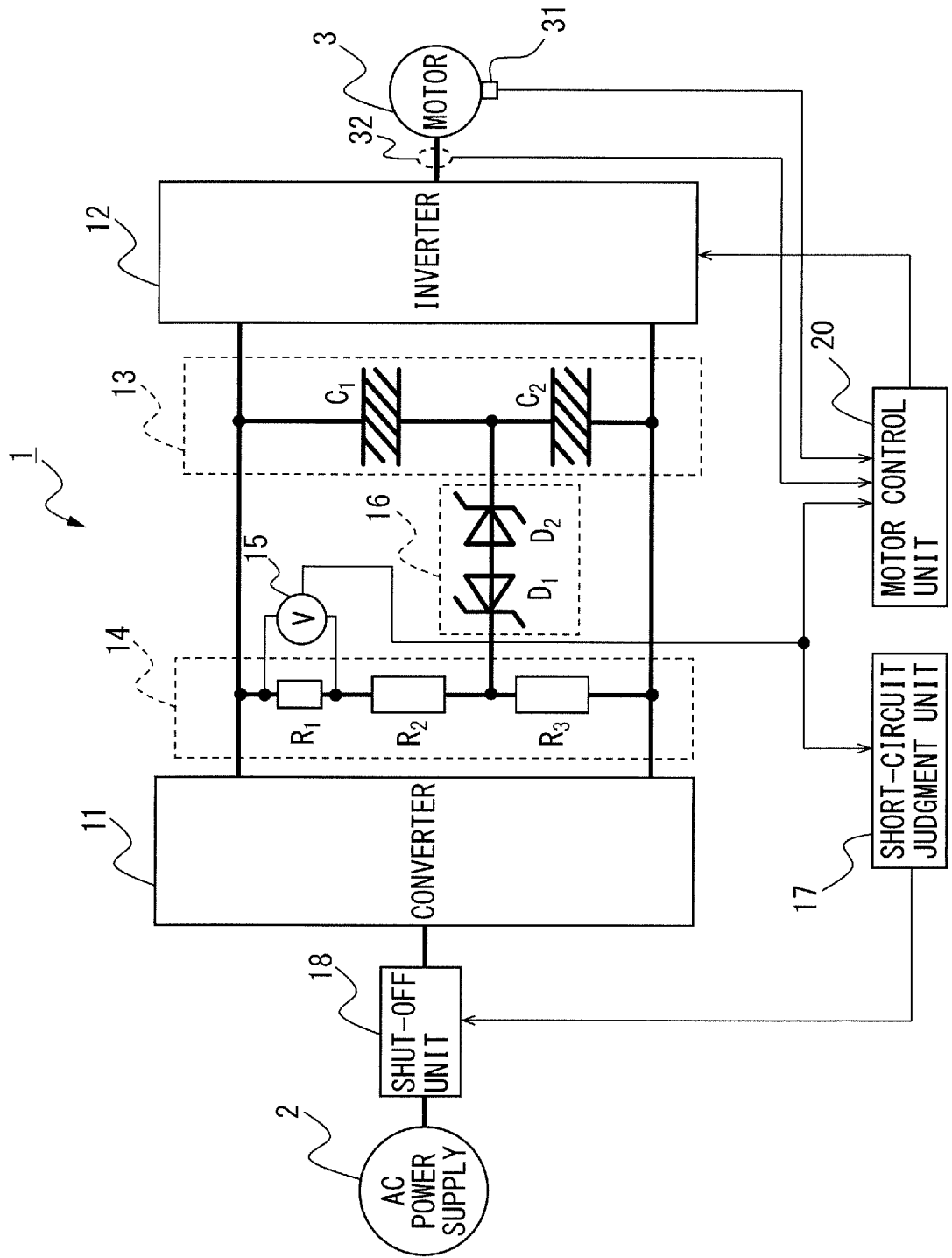
FIG. 2 is a circuit diagram illustrating a current-carrying element implemented as Zener diodes in the motor drive apparatus according to the embodiment of the present disclosure.

FIG. 2 is a circuit diagram illustrating a current-carrying element implemented as Zener diodes in the motor drive apparatus according to the embodiment of the present disclosure. The current-carrying element 16 can be implemented as two Zener diodes $D_1$ and $D_2$ connected in series with each other to be inversely biased in opposite directions, as illustrated in FIG. 2. The Zener diode is also called a reference diode. The Zener diode exhibits nearly the same property as that of normal diodes when a voltage is applied in the bias direction, but it exhibits the property of abruptly passing a current due to an avalanche breakdown when the voltage applied in the inverse bias direction is higher than a breakdown voltage (Zener voltage). The current-carrying element 16 includes the Zener diodes $D_1$ and $D_2$ connected in series with each other to be inversely biased in opposite directions. With such an arrangement, a current is carried only when the applied voltage is higher than a predetermined value (the breakdown voltage value of the Zener diode) both in the direction from the connection point between the resistor $R_2$ and the resistor $R_3$ to the connection point between the DC link capacitor $C_1$ and the DC link capacitor $C_2$ and the opposite direction. For example, the voltage applied to the current-carrying element 16 in the direction in which the connection point between the resistor $R_2$ and the resistor $R_3$ is positive and the connection point between the DC link capacitor $C_1$ and the DC link capacitor $C_2$ is negative is inversely biased for the Zener diode $D_1$ and biased for the Zener diode $D_2$. When this voltage becomes higher than the breakdown voltage of the Zener diode $D_1$, the Zener diode $D_1$ (i.e., the current-carrying element 16) carries a current, which flows from the connection point between the resistor $R_2$ and the resistor $R_3$ to the connection point between the DC link capacitor $C_1$ and the DC link capacitor $C_2$. Conversely, the voltage applied to the current-carrying element 16 in the direction in which the connection point between the resistor $R_2$ and the resistor $R_3$ is negative and the connection point between the DC link capacitor $C_1$ and the DC link capacitor $C_2$ is positive is biased for the Zener diode $D_1$ and inversely biased for the Zener diode $D_2$. When this voltage becomes higher than the breakdown voltage of the Zener diode $D_2$, the Zener diode $D_2$ (i.e., the current-carrying element 16) carries a current, which flows from the connection point between the DC link capacitor $C_1$ and the DC link capacitor $C_2$ to the connection point between the resistor $R_2$ and the resistor $R_3$.

Figure 3:
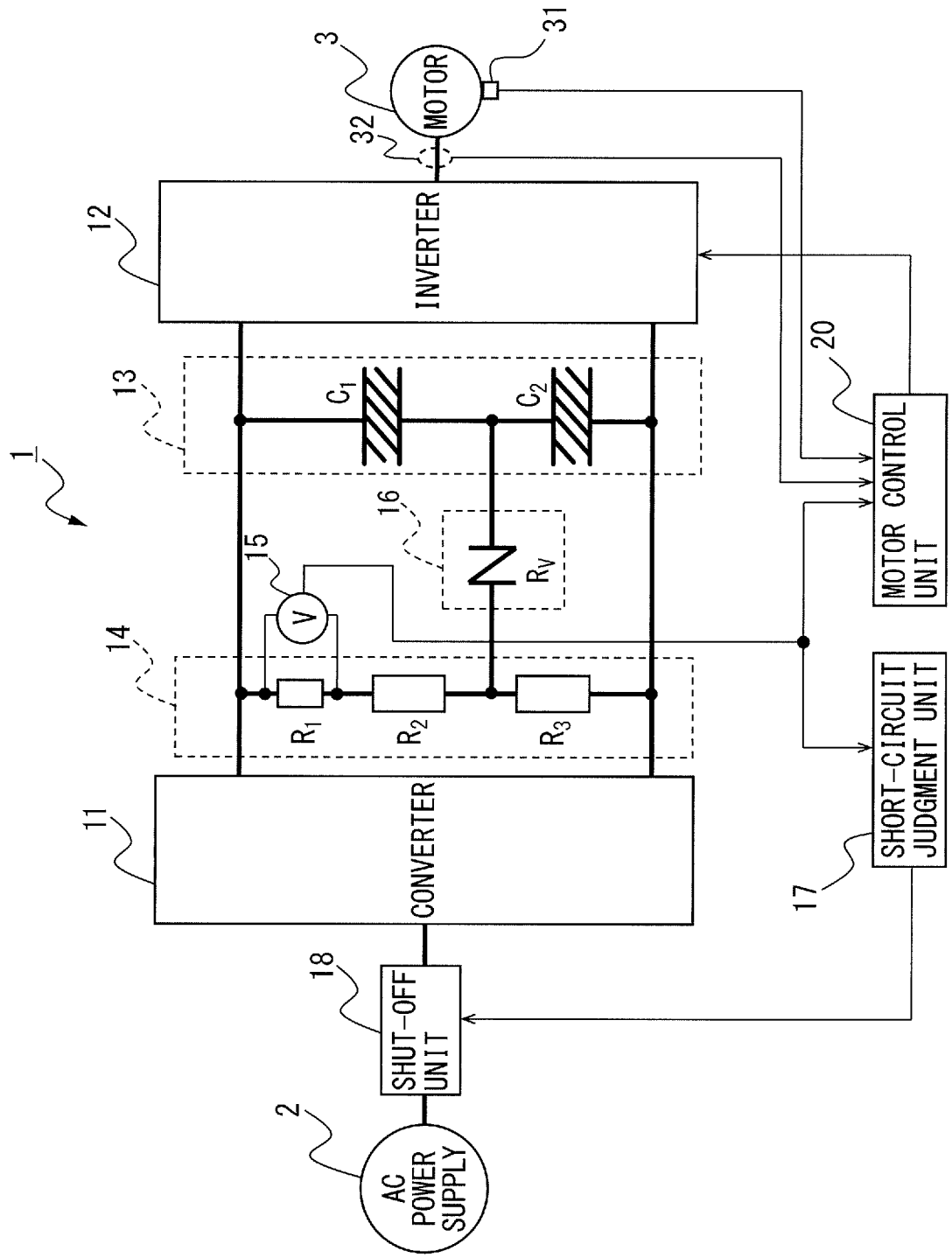
FIG. 3 is a circuit diagram illustrating a current-carrying element implemented as a varistor in the motor drive apparatus according to the embodiment of the present disclosure.

FIG. 3 is a circuit diagram illustrating a current-carrying element implemented as a varistor in the motor drive apparatus according to the embodiment of the present disclosure. The current-carrying element 16 can be implemented as a varistor $R_v$ exhibiting a predetermined resistance value when the applied voltage is equal to or lower than a predetermined value and exhibiting a resistance value smaller than the predetermined resistance value when the applied voltage is higher than the predetermined value, as illustrated in FIG. 3. The varistor $R_v$ is also called a "variable resistor" and serves as a nonlinear resistor whose resistance value changes depending on the voltage. The varistor $R_v$ is made of a material such as zinc oxide, strontium titanate, or silicon carbide. When, for example, the voltage applied to the current-carrying element 16 implemented as the varistor $R_v$ is higher than the predetermined value, the current-carrying element 16 carries a current.

Short-circuit judgment processing of the short-circuit judgment unit 17 and shut-off processing of the shut-off unit 18 will be described in more detail below with reference to FIGS. 4 and 5.

Figure 4:
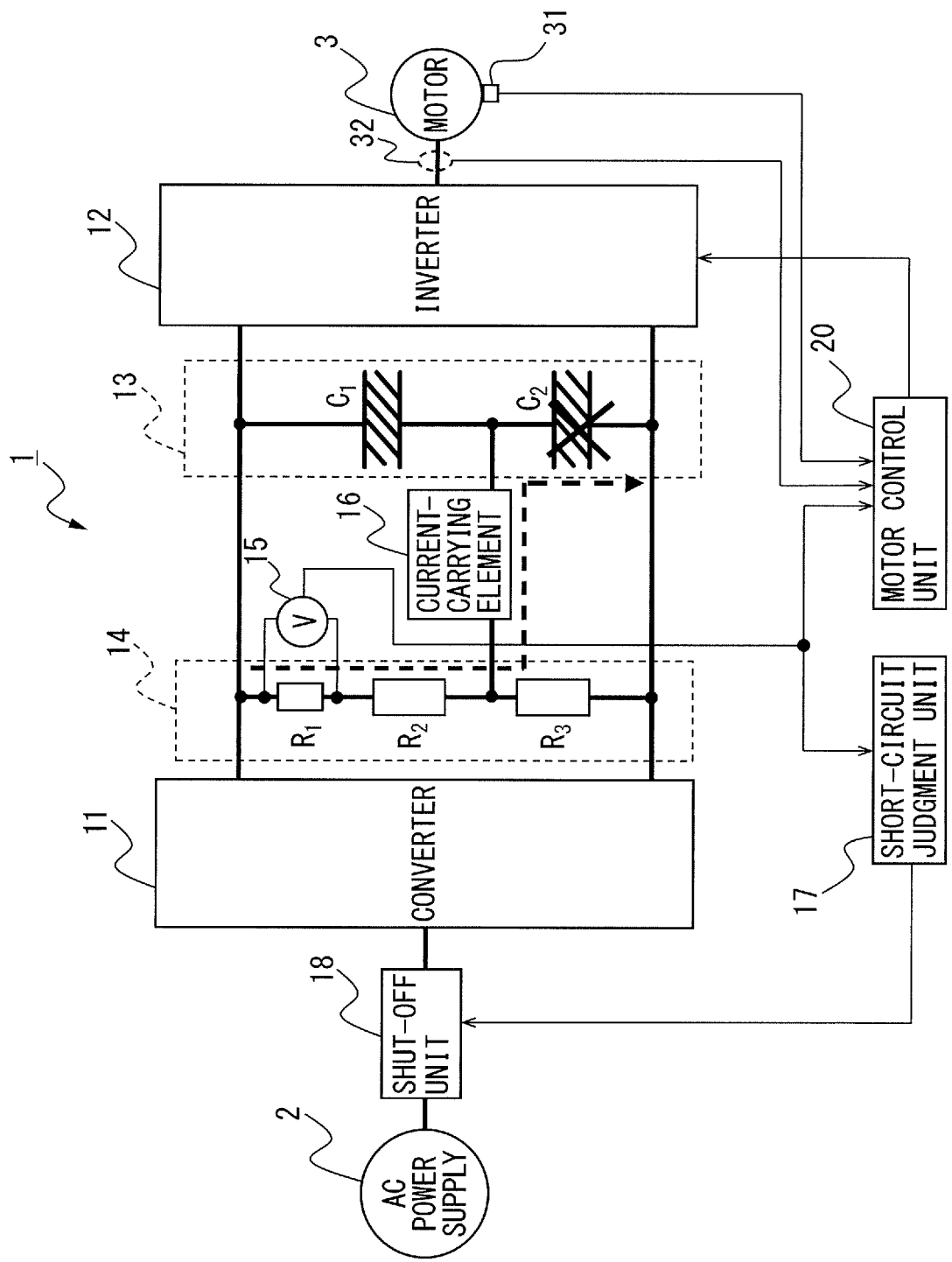
FIG. 4 is a circuit diagram illustrating current flow when short-circuit failure occurs in the lower DC link capacitor of two DC link capacitors in the motor drive apparatus according to the embodiment of the present disclosure.

FIG. 4 is a circuit diagram illustrating current flow when short-circuit failure occurs in the lower DC link capacitor of two DC link capacitors in the motor drive apparatus according to the embodiment of the present disclosure. In the normal state in which neither the DC link capacitor $C_1$ nor $C_2$ has short-circuit failure, the connection point between the resistor $R_2$ and the resistor $R_3$ and the connection point between the DC link capacitor $C_1$ and the DC link capacitor $C_2$ have nearly equal potentials, and little voltage is therefore applied to the current-carrying element 16. When short-circuit failure occurs in the lower DC link capacitor $C_2$, the voltage across the two terminals of the DC link capacitor $C_2$ becomes zero, and the potential of the connection point between the DC link capacitor $C_1$ and the DC link capacitor $C_2$ becomes zero. In other words, a potential difference which results in a high potential at the connection point between the resistor $R_2$ and the resistor $R_3$ and a low potential (zero potential) at the connection point between the DC link capacitor $C_1$ and the DC link capacitor $C_2$ occurs across the two terminals of the current-carrying element 16. When the voltage applied to the current-carrying element 16 gets higher than a predetermined value (e.g., the breakdown voltage when the current-carrying element 16 is implemented as the Zener diodes $D_1$ and $D_2$), the current-carrying element 16 carries a current, and, as a result, the current flowing out of the converter 11 flows via the resistors $R_1$ and $R_2$, the current-carrying element 16, and the shorted DC link capacitor $C_2$, as indicated by a bold broken line in FIG. 4. In this case, since the DC link voltage value detected by the DC link voltage detection unit 15 is larger than the upper limit, the short-circuit judgment unit 17 judges that one (i.e., the lower capacitor $C_2$) of the two capacitors $C_1$ and $C_2$ has shorted.

Figure 5:
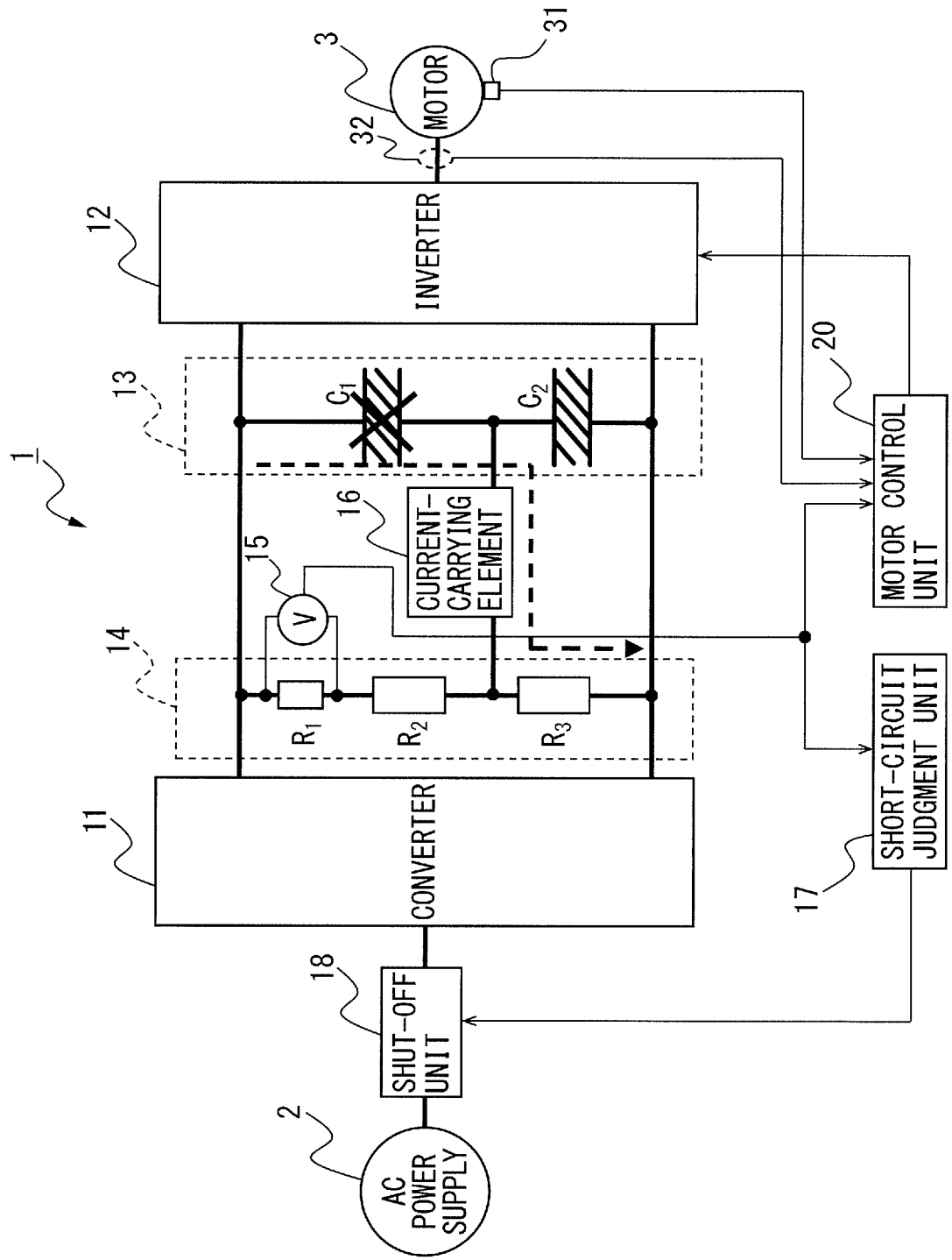
FIG. 5 is a circuit diagram illustrating current flow when short-circuit failure occurs in the upper DC link capacitor of the two DC link capacitors in the motor drive apparatus according to the embodiment of the present disclosure.

FIG. 5 is a circuit diagram illustrating current flow when short-circuit failure occurs in the upper DC link capacitor of the two DC link capacitors in the motor drive apparatus according to the embodiment of the present disclosure. In the normal state in which neither the DC link capacitor $C_1$ nor $C_2$ has short-circuit failure, the connection point between the resistor $R_2$ and the resistor $R_3$ and the connection point between the DC link capacitor $C_1$ and the DC link capacitor $C_2$ have nearly equal potentials, and little voltage is therefore applied to the current-carrying element 16. When short-circuit failure occurs in the upper DC link capacitor $C_1$, the voltage across the two terminals of the DC link capacitor $C_1$ becomes zero, and the potential of the connection point between the DC link capacitor $C_1$ and the DC link capacitor $C_2$ becomes equal to that on the positive side in the DC link. In other words, a potential difference which results in a low potential at the connection point between the resistor $R_2$ and the resistor $R_3$ and a high potential at the connection point between the DC link capacitor $C_1$ and the DC link capacitor $C_2$ occurs across the two terminals of the current-carrying element 16. When the voltage applied to the current-carrying element 16 gets higher than a predetermined value (e.g., the breakdown voltage when the current-carrying element 16 is implemented as Zener diodes), the current-carrying element 16 carries a current, and, as a result, the current flowing out of the converter 11 flows via the shorted DC link capacitor $C_1$, the current-carrying element 16, and the resistor $R_3$, as indicated by a bold broken line in FIG. 5. In this case, since the DC link voltage value detected by the DC link voltage detection unit 15 is smaller than the lower limit, the short-circuit judgment unit 17 judges that one (i.e., the upper capacitor $C_1$ of the two capacitors $C_1$ and $C_2$ has shorted.

The upper limit and the lower limit used in the short-circuit judgment processing of the short-circuit judgment unit 17 will be described herein. When all of the DC link capacitors 13 are normal, the DC link voltage value is ideally constant, but small fluctuations (ripples) actually occur due to factors associated with, e.g., the power conversion operations (switching operations) of the converter 11 and the inverter 12. More specifically, the DC link voltage value when all of the DC link capacitors 13 are normal fluctuates to fall within a predetermined range defined by a maximum value and a minimum value. When, however, at least one of the DC link capacitors 13 shorts, the DC link voltage value falls outside the predetermined range, as described above. Under the circumstances, in this embodiment, the upper limit used in the short-circuit judgment processing of the short-circuit judgment unit 17 is set to a value larger than the maximum value, in the predetermined range, of the DC link voltage value that may be taken when all of the DC link capacitors 13 are normal, and the lower limit used in the short-circuit judgment processing of the short-circuit judgment unit 17 is set to a value smaller than the minimum value, in the predetermined range, of the DC link voltage value that may be taken when all of the DC link capacitors 13 are normal. The short-circuit judgment unit 17 judges that at least one of the DC link capacitors 13 has shorted when the DC link voltage value is larger than the thus set upper limit or smaller than the thus set lower limit.

Figure 6:
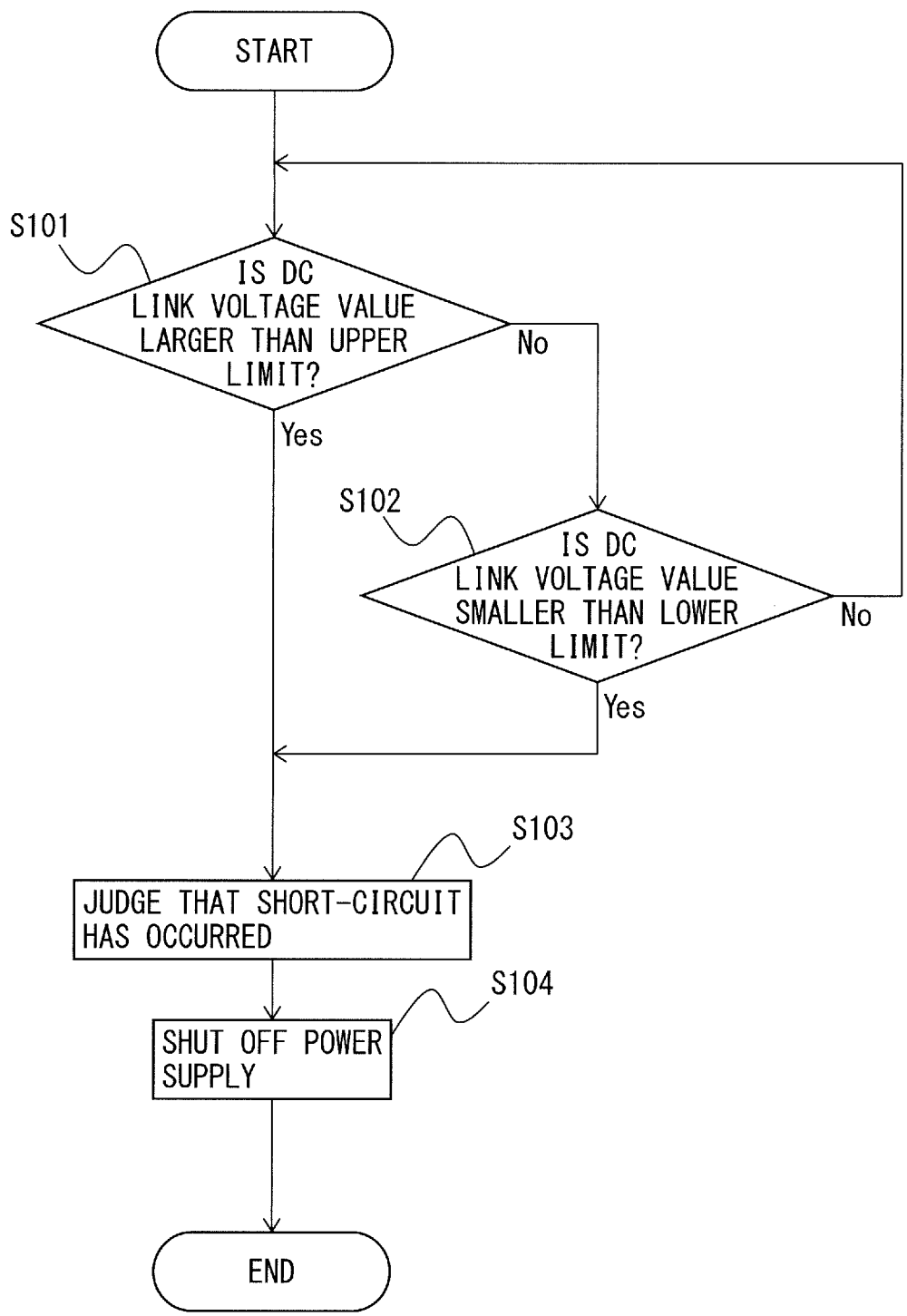
FIG. 6 is a flowchart illustrating the operation sequence of the motor drive apparatus according to the embodiment of the present disclosure.

FIG. 6 is a flowchart illustrating the operation sequence of the motor drive apparatus according to the embodiment of the present disclosure.

In the motor drive apparatus 1 according to this embodiment, when the motor 3 is driven by controlling the power conversion operation of the inverter 12 using the motor control unit 20, in step S101 the short-circuit judgment unit 17 compares the DC link voltage value detected by the DC link voltage detection unit 15 with a predetermined upper limit to judge whether the DC link voltage is higher than the upper limit. When the short-circuit judgment unit 17 judges in step S101 that the DC link voltage value is larger than the upper limit, the process advances to step S103; otherwise, the process advances to step S102.

In step S102, the short-circuit judgment unit 17 compares the DC link voltage value detected by the DC link voltage detection unit 15 with a predetermined lower limit to judge whether the DC link voltage is lower than the lower limit. When the short-circuit judgment unit 17 judges in step S102 that the DC link voltage value is smaller than the lower limit, the process advances to step S103; otherwise, the process returns to step S101.

The processing for judging whether the DC link voltage is higher than the upper limit in step S101, and the processing for judging whether the DC link voltage is lower than the lower limit in step S102 may be performed in reverse order.

In step S103, the short-circuit judgment unit 17 judges that at least one of the DC link capacitors 13 has shorted. The judgment result obtained by the short-circuit judgment unit 17 is sent to the shut-off unit 18.

In step S104, the shut-off unit 18 shuts off flow of AC power from the AC power supply 2 into the converter 11, in response to the short-circuit judgment by the short-circuit judgment unit 17. This reliably shuts off flow of power from the AC power supply 2 into the DC link via the converter 11, no current flows into normal capacitors having no short-circuit failure, no voltage is applied to them, and no breakage therefore occurs, ensuring safety.

FIGS. 1 to 6 illustrate, as an example, three series-connected voltage dividing resistors $R_1$, $R_2$, and $R_3$, but it suffices to use any plural number of voltage dividing resistors.

Figure 7:
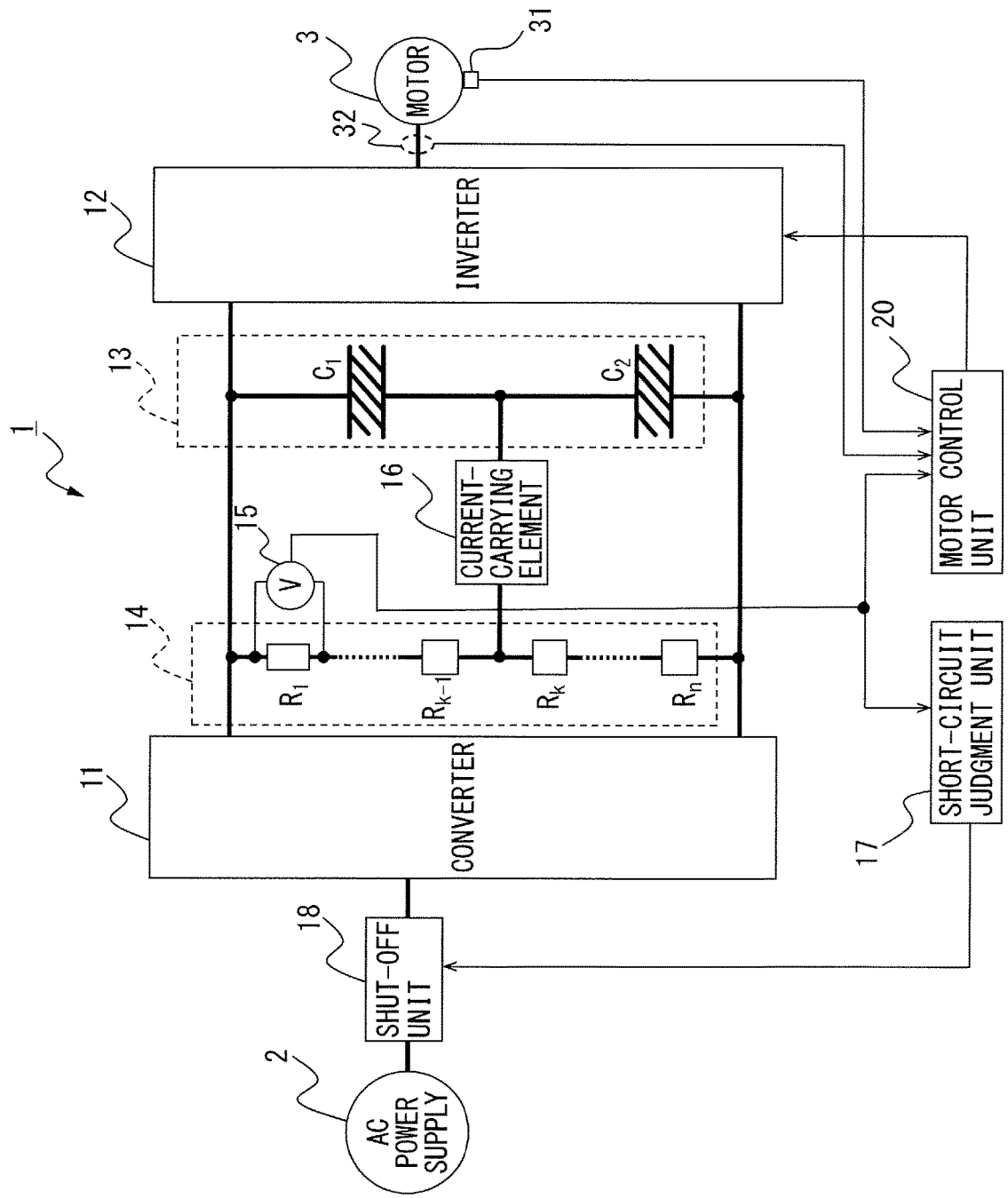
FIG. 7 is a circuit diagram illustrating n voltage dividing resistors used in the motor drive apparatus according to the embodiment of the present disclosure.

FIG. 7 is a circuit diagram illustrating n voltage dividing resistors used in the motor drive apparatus according to the embodiment of the present disclosure. In the example illustrated in FIG. 7, when n is a positive integer of 2 or more, k is an integer of 2 to n. FIG. 7 illustrates, as an example, the resistor $R_1$ as a voltage detection resistor, but it suffices to use one of the n voltage dividing resistors as a voltage detection resistor, as described above. The current-carrying element 16 is connected between the connection point connecting the DC link capacitor $C_1$ and the DC link capacitor $C_2$ to each other and the connection point connecting the resistor $R_{k-1}$ and the resistor $R_k$ to each other. Since circuit components other than the above-mentioned ones in FIG. 8 are the same as those illustrated in FIG. 1, the same reference numerals denote the same circuit components, and a detailed description thereof will not be given.

FIG. 8 is a circuit diagram for explaining a method for detecting a short-circuit of a DC link capacitor in a conventional motor drive apparatus. Referring to FIG. 8, a conventional motor drive apparatus 101 includes a converter 111 which converts AC power input from an AC power supply 2 into DC power and outputs the DC power to a DC link, an inverter 112 which converts the DC power in the DC link into AC power for driving a motor 3 and outputs the AC power, DC link capacitors $C_1$ and $C_2$ provided in the DC link and connected in series with each other, resistors $R_1$ and $R_2$ connected in series with each other, and a DC link voltage detection unit 113 which detects a DC link voltage value, based on a voltage applied to the resistor $R_1$. A motor control unit 120 in the motor drive apparatus 101 generates a switching command for controlling the speed, the torque, or the rotor position of the motor 3, based on, e.g., the rotation speed of the motor 3 detected by a speed detector 131, a current flowing through the winding of the motor 3 and detected by a current detector 132, a predetermined torque command, and an operation program for the motor 3. A power conversion operation by the inverter 112 is controlled based on the switching command generated by the motor control unit 120. The conventional motor drive apparatus 101, for example, includes short-circuit detection units 114-1 and 114-2 provided in the DC link capacitors $C_1$ and $C_2$, respectively, to detect short-circuit failure. However, providing short-circuit detection units 114-1 and 114-2 in the DC link capacitors $C_1$ and $C_2$, respectively, as hardware dedicated to short-circuit detection increases the circuit footprint, the number of parts, and the cost.

In contrast, since the motor drive apparatus 1 according to the embodiment of the present disclosure includes only the current-carrying element 16 as hardware provided for use in detection of short-circuit failure of the DC link capacitors 13 and may not include hardware dedicated to short-circuit detection for each DC link capacitor 13, unlike the conventional motor drive apparatus, the increases in circuit footprint and number of parts can be minimized, thus keeping the cost low. The DC link voltage detection unit 15 that detects the DC link voltage used in the short-circuit judgment processing by the short-circuit judgment unit 17 can employ a voltage detector generally provided to control the DC link voltage to be constant in the motor drive apparatus 1, and no new measurement device for short-circuit detection may be separately provided so that short-circuit failure of the capacitors can be detected at low cost.

The above-mentioned short-circuit judgment unit 17 and motor control unit 20 may be constructed in, e.g., software program form, or may be constructed as a combination of various electronic circuits and a software program. In this case, the function of each unit can be implemented by causing an arithmetic processing unit such as an ASIC or a DSP to operate the software program. Alternatively, the function of each unit may be implemented as a semiconductor integrated circuit in which a software program for implementing the functions of the short-circuit judgment unit 17 and the motor control unit 20 is written. The short-circuit judgment unit 17 may be provided in the motor control unit 20.

According to one aspect of the present disclosure, a motor drive apparatus which ensures safety by early detecting short-circuit failure of series-connected DC link capacitors provided in a DC link between a converter and an inverter at low cost can be achieved.

The invention claimed is:

1. A motor drive apparatus comprising:
a converter configured to convert AC power input from an AC power supply into DC power and output the DC power to a DC link;
an inverter configured to convert the DC power in the DC link into AC power for driving a motor and output the AC power;
a plurality of DC link capacitors provided in the DC link and connected in series with each other;
a plurality of resistors connected in parallel with the plurality of DC link capacitors and connected in series with each other;
a DC link voltage detection unit configured to detect a DC link voltage value as a value of a voltage applied to a positive and negative terminal of the DC link, based on a voltage applied to one of the plurality of resistors;
a current-carrying element including a single semiconductor device or at least two semiconductor devices wired in series with one another, the current-carrying element is connected between a first connection point of one of connection points connecting the DC link capacitors to each other and a second connection point of one of connection points connecting the resistors to each other, and is configured to:
carry a first current in first direction through the current-carrying element the first connection point to the second connection point only when a voltage of a first polarity applied to the current-carrying element via the first connection point and the second connection point is higher than a predetermined value, and
carry a second current in second direction through the current-carrying element from the second connection point to the first connection point only when a voltage of a second polarity applied to the current-carrying element via the first connection point and the second connection point is higher than the predetermined value; and
a short-circuit judgment unit configured to judge that at least one of the plurality of DC link capacitors has shorted in one of a case where the DC link voltage value is larger than a predetermined upper limit and a case where the DC link voltage value is smaller than a predetermined lower limit.

2. The motor drive apparatus according to claim 1, further comprising: a shut-off unit configured to shut off flow of the AC power from the AC power supply into the converter when the short-circuit judgment unit judges that at least one of the plurality of capacitors has shorted.

3. The motor drive apparatus according to claim 1, wherein
the current-carrying element comprises two Zener diodes connected in series with each other to be inversely biased in opposite directions, and
the predetermined value comprises breakdown voltage values of the Zener diodes.

4. The motor drive apparatus according to claim 1, wherein the current-carrying element comprises a varistor exhibiting a predetermined resistance value when the applied voltage is not more than the predetermined value and exhibiting a resistance value smaller than the predetermined resistance value when the applied voltage is higher than the predetermined value.

* * * * *